(12) United States Patent
Chen et al.

(10) Patent No.: US 9,042,474 B2
(45) Date of Patent: May 26, 2015

(54) METHOD AND APPARATUS FOR INFORMATION FEEDBACK AND PRECODING

(75) Inventors: Jinhui Chen, PuDong Jinqiao Shanghai (CN); Hongwei Yang, PuDong Jinqiao Shanghai (CN); Di Lv, PuDong Jinqiao Shanghai (CN); Yang Song, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/639,438

(22) PCT Filed: Apr. 7, 2010

(86) PCT No.: PCT/CN2010/071588
§ 371 (c)(1),
(2), (4) Date: Oct. 4, 2012

(87) PCT Pub. No.: WO2011/124021
PCT Pub. Date: Oct. 13, 2011

(65) Prior Publication Data
US 2013/0028344 A1      Jan. 31, 2013

(51) Int. Cl.
*H04B 7/04* (2006.01)
*H04B 7/06* (2006.01)

(52) U.S. Cl.
CPC ............ *H04B 7/0417* (2013.01); *H04B 7/0456* (2013.01); *H04B 7/0478* (2013.01); *H04B 7/0626* (2013.01); *H04B 7/0634* (2013.01); *H04B 7/0639* (2013.01)

(58) Field of Classification Search
CPC .................................................... H04B 7/0456
USPC ........................................................ 375/267
See application file for complete search history.

(56) References Cited

U.S. PATENT DOCUMENTS

2005/0281357 A1* 12/2005 Bouvet et al. ............... 375/340
2007/0140370 A1    6/2007 Helard et al.
(Continued)

FOREIGN PATENT DOCUMENTS

| CN | 1842986 A | 10/2006 |
|---|---|---|
| CN | 101136718 A | 3/2008 |

(Continued)

OTHER PUBLICATIONS

International Search Report for PCT/CN2010/071588 dated Jul. 15, 2010.
(Continued)

*Primary Examiner* — Erin File
(74) *Attorney, Agent, or Firm* — Fay Sharpe LLP

(57) ABSTRACT

Methods and apparatuses for information feedback and precoding have been provided. A method for processing communication data at a user equipment in a wireless communication system may comprise: deriving a spatial correlation matrix R of multiple transmit antennas of a base station based on an obtained downlink channel transmission matrix H; transforming a precoding codebook F according to the spatial correlation matrix R; selecting a precoding matrix $F_s$ based on the transformed precoding codebook; and feeding back information about the spatial correlation matrix R and information about the selected precoding matrix $F_s$ to the base station. A method for data precoding at a base station in a wireless communication system may comprise: obtaining, from a user equipment, information about a spatial correlation matrix R of multiple transmit antennas of the base station and information about a precoding matrix $F_s$ selected by the user equipment; determining a desired precoding matrix $F_{R,s}$ based on the obtained information and a precoding codebook; and precoding downlink data to be transmitted to the user equipment with the desired precoding matrix $F_{R,s}$.

12 Claims, 9 Drawing Sheets

(56) References Cited

U.S. PATENT DOCUMENTS

| | | | | |
|---|---|---|---|---|
| 2009/0117862 | A1* | 5/2009 | Le Nir et al. | 455/101 |
| 2009/0279624 | A1* | 11/2009 | Chen et al. | 375/260 |
| 2010/0027713 | A1 | 2/2010 | Huang et al. | |
| 2010/0098144 | A1* | 4/2010 | Clerckx et al. | 375/224 |
| 2010/0142640 | A1* | 6/2010 | Zhao et al. | 375/285 |
| 2013/0044602 | A1* | 2/2013 | Xiao et al. | 370/237 |
| 2013/0088981 | A1* | 4/2013 | Lv et al. | 370/252 |

FOREIGN PATENT DOCUMENTS

| | | |
|---|---|---|
| CN | 101257367 A | 9/2008 |
| CN | 101388702 | 3/2009 |
| EP | 2 037 646 A2 | 9/2008 |
| WO | WO 2009/136728 A2 | 11/2009 |
| WO | WO 2010/002691 A2 | 1/2010 |

OTHER PUBLICATIONS

Japanese Office Action dated Sep. 26, 2013.
Korean Office Action dated May 16, 2014.
Alcatel-Lucent Shanghai Bell, Alcatel-Lucent, "Correlation-based feedback", 3GPP TSG RAN WG1 Meeting #60, R1-100931, San Francisco, CA, USA, Feb. 22-26, 2010.
Motorola, "Spatial Correlation Feedback to Support LTE-A MU-MIMO and CoMP: System Operation and erformance Results", R1-092221, TSG-RAN WG1 #57, San Francisco, CA, USA, May 4-8, 2009.
Motorola, "Low-Overhead Feedback of Spatial Covariance Marix", R1-100190, 3GPP TSG RAN1#59, Valencia, Spain, Jan. 18-22, 2010.
Love, David J., et al., "Limited Feedback Diversity Techniques for Correlated Channels", IEEE Transactions on Vehicular Technology, vol. 55, No. 2, Mar. 2006, pp. 718-722.
Jorswieck, Eduard A., et al., "Channel Capacity and Capacity-Range of Beamforming in MIMO Wireless Systems Under Correlated Fading with Covariance Feedback", IEEE Transactions on Wireless Communications, vol. 3, No. 5, Sep. 2004, pp. 1543-1553.

* cited by examiner

METHOD AND APPARATUS FOR INFORMATION FEEDBACK AND PRECODING

FIELD OF THE INVENTION

Embodiments of the present invention generally relate to wireless communication systems, and more particularly to methods and apparatuses for downlink information feedback and precoding.

BACKGROUND OF THE INVENTION

In Multiple Input Multiple Output (MIMO) wireless communication systems, both of the transmitter and the receiver use antenna arrays to provide a rich diversity and a large communication capacity. Spatial multiplexing is a common space-time modulation technique for MIMO communication systems where independent data streams are transmitted via different transmit antennas. Unfortunately, the spatial multiplexing is very sensitive to the poor condition of the channels. For this end, a precoding technique is employed for improving the adaptability of the spatial multiplexing.

The function of the precoding is to pre-process the data streams to be transmitted and to map the data streams to respective transmitting antennas, based on the channel conditions. In Long Term Evolution (LTE) systems and LTE-Advanced (LTE-A) systems, a codebook based limited feedback precoding technique is used at the transmitting side.

For the limited feedback precoding, there are at least two feedback mechanisms, i.e., explicit feedback and implicit feedback. In the explicit feedback, the receiver feeds back information about the channel condition to the transmitter, and then the transmitter precodes the data streams to be transmitted based on the feedback channel condition. The implicit feedback defines different feedback modes for different assumptions, such as single-user MIMO (SU-MIMO) or multi-user MIMO (MU-MIMO), etc. Generally, in the implicit feedback, the receiver selects an optimal precoder from a finite codebook known to both the transmitter and the receiver based on the channel condition, and then feeds back information (e.g., an index) about the optimal precoder to the transmitter.

So far, implicit feedback solutions where single-user one-rank correlation adaptability is implemented by using the precoding codebook defined in the existing specifications have been proposed by Intel., Huawei, etc. "Correlation adaptability" means modifying the predefined precoding codebook by using downlink spatial correlation matrix, and "rank" refers to the number of the data streams to be transmitted at the transmitter. However, the proposed implicit feedback solutions are only for the single-user MIMO single-stream cases. For multi-rank cases, the system performance will rapidly deteriorate. Yet in the existing implicit feedback system, it is required to transmit multiple data streams for multiple users and to transmit multiple data streams per user.

In the current standardization process of the LTE-A, the limited feedback precoding technique is still in discussion and research. As yet, a fixed precoding codebook is still used for the multiple users and multiple data streams cases, but the implicit feedback solutions with spatial correlation adaptability merely adapt to the single-user single-stream cases.

SUMMARY OF THE INVENTION

Thus, there is a need in the art for a spatial correlation adaptable implicit feedback solution which can adapt to multiple streams cases.

According to one exemplary aspect of the present invention, a method for processing communication data at a user equipment in a wireless communication system is provided. The method comprises: deriving a spatial correlation matrix R of multiple transmit antennas of a base station based on an obtained downlink channel transmission matrix H; transforming a precoding codebook F according to the spatial correlation matrix R; selecting a precoding matrix $F_s$ based on the transformed precoding codebook; and feeding back information about the spatial correlation matrix R and information about the selected precoding matrix $F_s$ to the base station.

In one embodiment, the deriving may comprise averaging the downlink channel transmission matrix H in time and/or frequency to obtain the spatial correlation matrix R.

In one embodiment, the transforming may comprise: quantizing the spatial correlation matrix R and transforming the precoding codebook with the quantized spatial correlation matrix. Each codeword $F_k$ in the precoding codebook is transformed to obtain the transformed precoding matrix $F_{R,k}$ according to $F_{R,k}=RF_k$, where k=1, ..., K, and K is a position integer.

In one embodiment, the selecting may comprise singular value decomposing the downlink channel transmission matrix H to obtain $H=U\Sigma V^H$; taking the first m columns of elements in the unitary singular matrix V obtained from the singular value decomposition as an ideal precoding matrix $V_m$, where m is the number of data streams transmitted to the user equipment; and selecting the precoding matrix $F_s$ from the precoding codebook such that the distance between a precoding matrix $F_R$ transformed via the spatial correlation matrix and the ideal precoding matrix $V_m$ is minimized. The distance may be $$1 - \frac{tr(\text{abs}(V_m F_k^H))}{\|V_m\|_F \|F_k\|_F},$$

where k=1, ..., K, K is a position integer, $^H$ denotes conjugate transpose, $\|\cdot\|_F$ denotes matrix Frobenius norms, abs( ) denotes the modular of a matrix, and tr( ) denotes the trace of a matrix. Alternatively, the distance may be chosen from a group consisted of the chordal distance, the projection two-norm distance and the Fubini-Study distance.

In one embodiment, the information about the selected precoding matrix $F_s$ is an index of the selected precoding matrix $F_s$ in the precoding codebook; and the information about the spatial correlation matrix R is an index of the spatial correlation matrix R in a spatial correlation matrix codebook.

According to another exemplary aspect of the present invention, a method for data precoding at a base station in a wireless communication system is provided. The method comprises: obtaining, from a user equipment, information about a spatial correlation matrix R of multiple transmit antennas of the base station and information about a precoding matrix $F_s$ selected by the user equipment; determining a desired precoding matrix $F_{R,s}$ based on the obtained information and a precoding codebook; and precoding downlink data to be transmitted to the user equipment with the desired precoding matrix $F_{R,s}$.

In one embodiment, the determining may comprise: retrieving the selected precoding matrix $F_s$ from the precoding codebook based on the information about the selected precoding matrix $F_s$, wherein the information about the selected precoding matrix includes an index of the selected precoding matrix in the precoding codebook; retrieving the spatial correlation matrix R from a spatial correlation matrix codebook based on the information about the spatial correlation matrix R, wherein the information about the spatial correlation matrix R includes an index of the spatial correlation matrix R in the spatial correlation matrix codebook; and transforming the selected precoding matrix $F_s$ with the spatial correlation matrix R to obtain the desired precoding matrix $F_{R,s}$.

In one embodiment, the precoding may comprise: taking the conjugate transpose of the desired preocoding matrix $F_{R,s}$ as an approximate effective channel matrix of the user equipment; and precoding the downlink data to be transmitted to the user equipment based on the approximate effective channel matrix.

In another embodiment, in a case where there are multiple user equipments, the precoding may comprise: scheduling user equipments of the multiple user equipments whose desired precoding matrices $F_{R,s}$ are orthogonal to each other precoding matrices.

According to yet another exemplary aspect of the present invention, an apparatus for processing communication data at a user equipment in a wireless communication system is provided. The apparatus may comprise: a deriving module, configured to derive a spatial correlation matrix R of multiple transmit antennas of a base station based on an obtained downlink channel transmission matrix H; a transforming module, configured to transform a precoding codebook F according to the spatial correlation matrix R; a selecting module, configured to select a precoding matrix $F_s$ based on the transformed precoding codebook; and a feedback module, configured to feed back information about the spatial correlation matrix R and information about the selected precoding matrix $F_s$ to the base station.

According to a further exemplary aspect of the present invention, an apparatus for data precoding at a base station in a wireless communication system is provided. The apparatus may comprise: an obtaining module, configured to obtain, from a user equipment, information about a spatial correlation matrix R of multiple transmit antennas of the base station and information about a precoding matrix $F_s$ selected by the user equipment; a determining module, configured to determine a desired precoding matrix $F_{R,s}$ based on the obtained information and a precoding codebook; and a precoding module, configured to precode downlink data to be transmitted to the user equipment with the desired precoding matrix $F_{R,s}$.

Embodiments of the present invention may be adaptable to both single user SU-MIMO and multiple users MU-MIMO. Moreover, for each user equipment, it may have a single stream or multiple streams. Compared with the prior art, because the spatial correlation information specific to each user equipment (UE) has been fed back to the base station (eNB), significant performance gain may be achieved by using the spatial correlation adaptable codebook than using a fixed codebook. In addition, the solutions as proposed in the invention are easy to implement. For example, the current LTE Release 8 4-Tx feedback codebook can be used as the baseline codebook for correlation adaptation. The only extra signaling overhead would be used for feeding back the spatial correlation matrix. Further, the computational complexity of the embodiments of the present invention is quite low.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION OF EMBODIMENTS

Hereinafter, exemplary description of the embodiments of the present invention will be described in detail with reference to the attached drawings.

Figure 1:
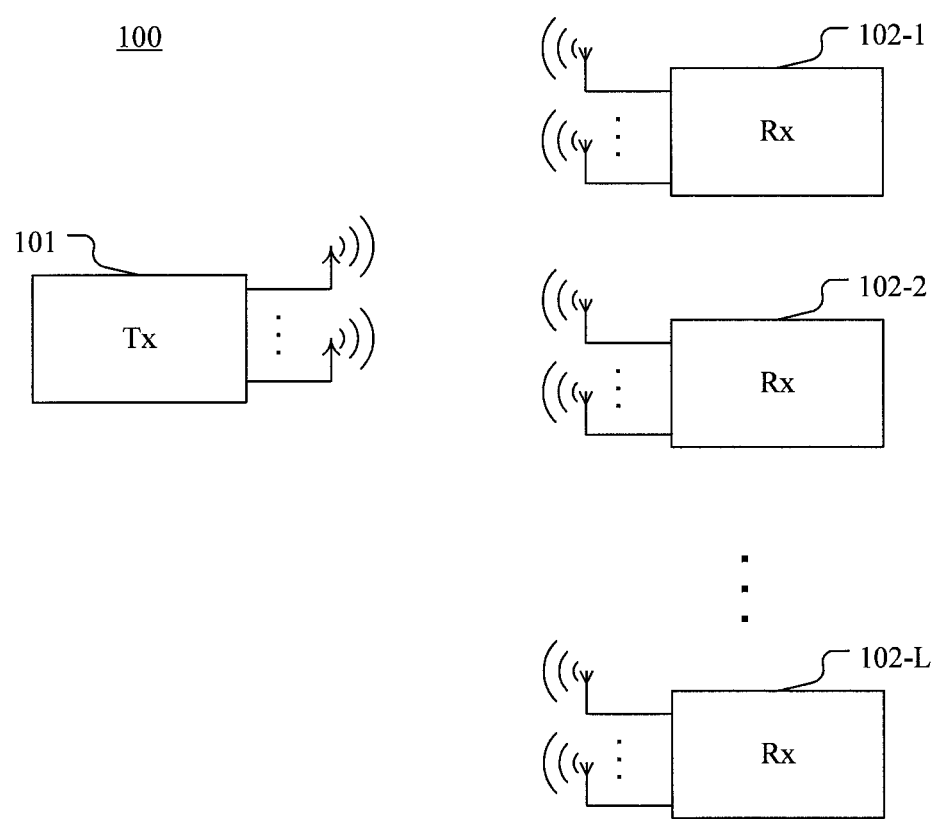
FIG. 1 illustrates an exemplary environment of wireless communication systems where embodiments of the present invention may be implemented.

With reference to FIG. 1, an example of wireless communication network environment 100 where embodiments of the present invention may be implemented is shown. As illustrated in FIG. 1, in the wireless communication network environment 100, there may be a transmitter 101 and several receivers 102-1, 102-2, . . . 102-L, where L is an integer greater than or equal to 1. The transmitter 101 has M transmit antennas, and each receiver has N receive antennas, where either of M and N is an integer greater than 1. The transmitter transmits m data streams to each of the receivers, where m≤min (M, N). In various embodiments, the transmitter may be for example a base station (BS), or known as an eNB in LTE and LTE-A systems. The receivers 102 may be for example user equipments (UEs). In the following descriptions, a base station (eNB) and multiple user equipments (UEs) are taken as examples for illustration.

Because the uplink and downlink channels between a user equipment (UE) and a base station (eNB) are not symmetric, the eNB needs information about downlink fed back by the UE, based on which the data to be transmitted to the UE may be precoded.

Figure 2:
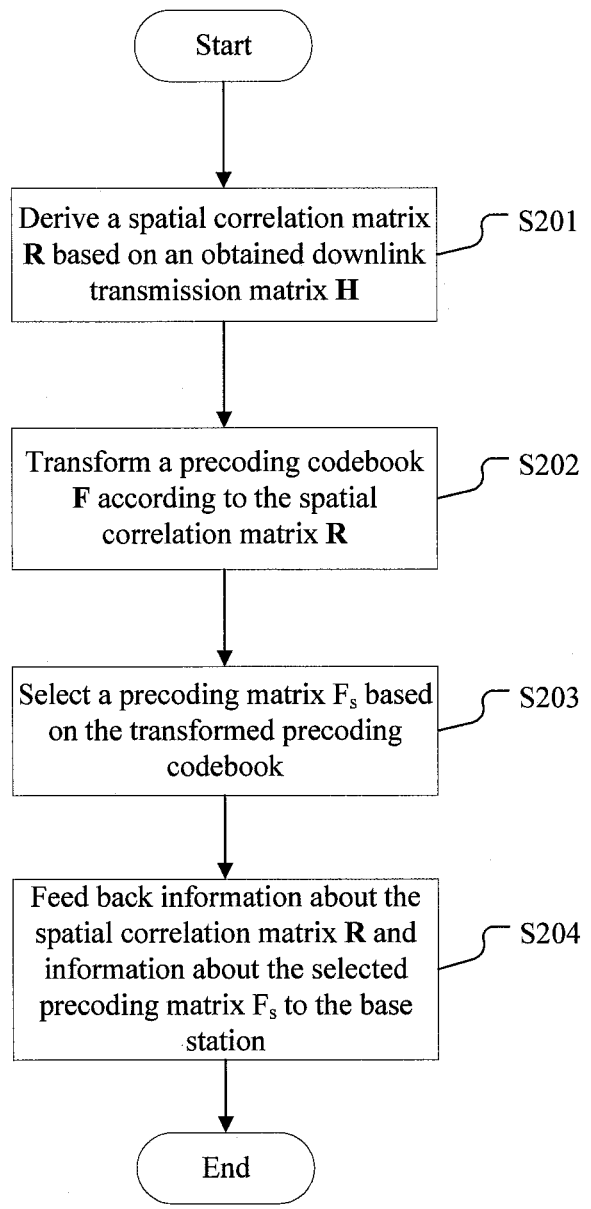
FIG. 2 illustrates an exemplary logic flow chart of a method for processing communication data at a user equipment in a wireless communication system according to one embodiment of the present invention.

Now with reference to FIG. 2, it illustrates an exemplary logic flow chart of a method for processing communication data at a user equipment UE in a wireless communication system according to one embodiment of the present invention. In the following, the flow of FIG. 2 will be described in detail in conjunction with the wireless communication network environment 100 as shown in FIG. 1.

As shown in FIG. 2, at the step S201, at each user equipment (UE), a spatial correlation matrix R of M transmit antennas of the base station (eNB) is derived based on an obtained downlink channel transmission matrix H, where H is a two-dimension matrix of N×M, and R is a two-dimension matrix of M×M.

Generally, the user equipment (UE) may perform channel estimation according to the downlink channel signal received from the base station (eNB), so as to obtain the downlink channel transmission matrix H. Specifically, it is well known in the art as how to perform channel estimation. Reference may be made to "Digital Communication", John G. Proakis, and the description thereof is omitted herein.

In one embodiment, the obtained downlink channel transmission matrix H is averaged in time and/or frequency to get the spatial correlation matrix R of M transmit antennas of the base station. For example, $R=E[H^H \cdot H]$, where $^H$ denotes conjugate transpose. In other words, R is the mean value of $H^H \cdot H$ on multiple time points and/or on multiple subcarriers.

The spatial correlation matrix R of multiple transmit antennas of the base station (eNB) is a physical quantity changing slowly over time. Therefore, the downlink channel transmission matrix H may be averaged over a long period, such as more than 20 ms.

Then, at the step S202, a precoding codebook F is transformed according to the spatial correlation matrix R.

In the limited feedback precoding technique, there is a precoding codebook F which is known to both the user equipment (UE) and the base station (eNB). The precoding codebook is consisted of a limited number of codewords, e.g., K codewords, where each codeword $F_k$ is a precoding matrix of M×m, where k=1, ..., K, and K is a position integer. Such a precoding codebook may be for example the precoding matrix index (PMI) codebook defined in LTE release 8, the codebook defined in IEEE 802.16m standards, etc.

m is the number of data streams to be transmitted from the base station (eNB) to a certain user equipment (UE). The number of data streams to be transmitted may be set in advance by the communication system, or it may be determined dynamically by the base station based on the real-time channel conditions.

In one embodiment, the spatial correlation matrix R may be quantized. Then the precoding codebook F maybe be transformed with the quantized spatial correlation matrix R to get the transformed precoding codebook $F_R$. The subscript $_R$ denotes being transformed with the spatial correlation matrix, i.e., being processed by the spatial correlation adaption.

Many manners may be adopted to quantize the spatial correlation matrix R. In one embodiment, the spatial correlation matrix R may be quantized according to a spatial correlation matrix codebook. Similarly to the precoding codebook, the spatial correlation matrix codebook is also a codebook consisted of a limited number of matrices which is known to or synchronized to both the user equipment (UE) and the base station (eNB). Various manners may be adopted to design the spatial correlation matrix codebook. In various embodiment of the present invention, only the designed spatial correlation matrix will be utilized, and thus the design manners thereof will not be described in detail here.

In one embodiment, each codeword $F_k$ in the precoding codebook F is transformed to obtain the corresponding transformed precoding matrix $F_{R,k}$ according to:

$F_{R,k}=RF_k$.

Next, in the step S203, a precoding matrix $F_s$ is selected based on the transformed precoding codebook $F_R$.

At each user equipment i (i=1, ..., L), a precoding matrix which is desired to use may be selected from the precoding codebook based on different selection criterions. These selection criteria may be for example the maximum likelihood criterion (ML-SC), the minimum singular value selection criterion (MSV), the minimum mean squared error selection criterion (MMSE-SC), and capacity selection criterion (Capacity-SC), etc.

Study shows that for single user precoding, all these criteria are in fact equivalent. The optimal selected precoding matrix by the user equipment (UE) is the conjugate transpose of the primary eigen mode of the downlink channel transmission matrix H. For example, reference may be made to D. J. Love, R. W. Heath, Jr., "Limited feedback Unitary Precodings for Spatial Multiplexing Systems," IEEE Transactions on Information Theory, Vol. 51, No. 8, 2005, pp 2967-2976.

Specifically, for UE i, its obtained downlink channel transmission matrix $H_i$ is singular value decomposed (SVD) to get $H_i=U_i\Sigma_i V_i^H$. The first m columns of elements of $V_i$ are taken to construct a two-dimension matrix $V_{m,i}$ of M×m, wherein $V_i$ is a two-dimension unitary matrix of M×M at the right side obtained by the singular value decomposition. At the UE i, the optimal precoding matrix is: $F_{opt,i}=V_{m,i}$.

With the above result, in one embodiment of the present invention, a precoding matrix closest to the preferred precoding matrix is selected from the transformed precoding codebook $F_R$ as obtained in step 202. Because each precoding matrix $F_{R,k}$ in the transformed precoding codebook $F_R$ may be expressed as $F_{R,k}=RF_k$, from another angle, a precoding matrix $F_s$ is selected from the fixed precoding codebook F, such that the distance between the precoding matrix being transformed with the spatial correlation matrix R and the optimal precoding matrix is minimized.

Specifically, in one embodiment, for each user equipment UE, the obtained downlink channel transmission matrix H is subjected to the singular value decomposition (SVD), deriving $H=U\Sigma V^H$. It should be noted that similar processing is performed at each user equipment UE, the following description omits the subscript i representing the user equipment.

Taking the first m columns of elements of the right side unitary singular matrix V derived from the above singular value decomposition as the optimal precoding matrix $V_m$, wherein m denotes the number of data streams transmitted to the user equipment. From the transformed precoding codebook $F_R$, a precoding matrix $F_{R,s}$ with the minimal distance from the optimal precoding matrix $V_m$ is selected, wherein the subscript s denotes the selected precoding matrix. Such selected precoding matrix $F_{R,s}$ is just the precoding matrix which the user equipment expects the eNB to use. The above selection process may be denoted as:

$F_{R,s}=\arg\min_{F_{R,k}\in F_R} d(V_m F_{R,k}^H)$, wherein, $d(V_m F_{R,k}^H)$ is the distance function for $V_m F_{R,k}^H$.

In one embodiment, the distance function $d(V_m F_{R,k}^H)$ may be:

$$d(V_m F_{R,k}^H) = 1 - \frac{tr(\text{abs}(V_m F_{R,k}^H))}{\|V_m\|_F \|F_{R,k}\|_F},$$

wherein $^H$ denotes conjugate transpose, $\|\cdot\|_F$ denotes matrix Frobenius norms, abs( ) denotes the modular of a matrix, and tr( ) denotes the trace of a matrix.

In another embodiment, the distance function may adopt other form, for example, the chordal distance, the projection two-norm distance, the Fubini-Study distance, etc.

Because the precoding matrix $F_{R,k}$ in the transformed precoding codebook $F_R$ may be expressed as $F_{R,k}=RF_k$, the above selection process may also be expressed as:

$F_s=\arg\min_{F_k\in F} d(V_m(RF_k)^H)=\arg\min_{F_k\in F} d(V_m F_k^H R)$,
because $R^H=R$.

In other words, a precoding matrix $F_s$ is selected from the fixed precoding codebook F, such that the distance between the precoding matrix $F_{R,s}$ being transformed with the spatial correlation matrix R and the optimal precoding matrix $V_m$ is minimized.

Finally, in step S204, the user equipment may feed back the relevant information of the spatial correlation matrix R and the relevant information of the selected precoding matrix $F_s$ to the base station eNB.

In one embodiment, the relevant information of spatial correlation matrix R comprises an index of the spatial correlation matrix R in the spatial correlation matrix codebook when the spatial correlation matrix R is quantized in step S202, while the relevant information of the selected precoding matrix $F_s$ comprises an index of the selected precoding matrix $F_s$ in the fixed precoding codebook F.

Besides, as mentioned above, the spatial correlation matrix R is a physical quantity slowly varying with time, and thus the feedback information may also be called as a long-term wideband precoding matrix index PMI. In contrast, the downlink channel transmission channel H is a physical quantity rapidly changing with time, and thus its feedback information may also be called as a short-term narrowband PMI. For example, the feedback period of the long-term wideband PMI may be 20 ms above, while the feedback period of the short-term narrowband PMI is about 5 ms.

Because the user equipment UE and the base station eNB have known the spatial correlation matrix codebook and the precoding codebook, the user equipment UE only needs to feed back the corresponding indexes to the base station eNB. Then the base station eNB may obtain the spatial correlation matrix R and the selected precoding matrix $F_s$.

Figure 3:
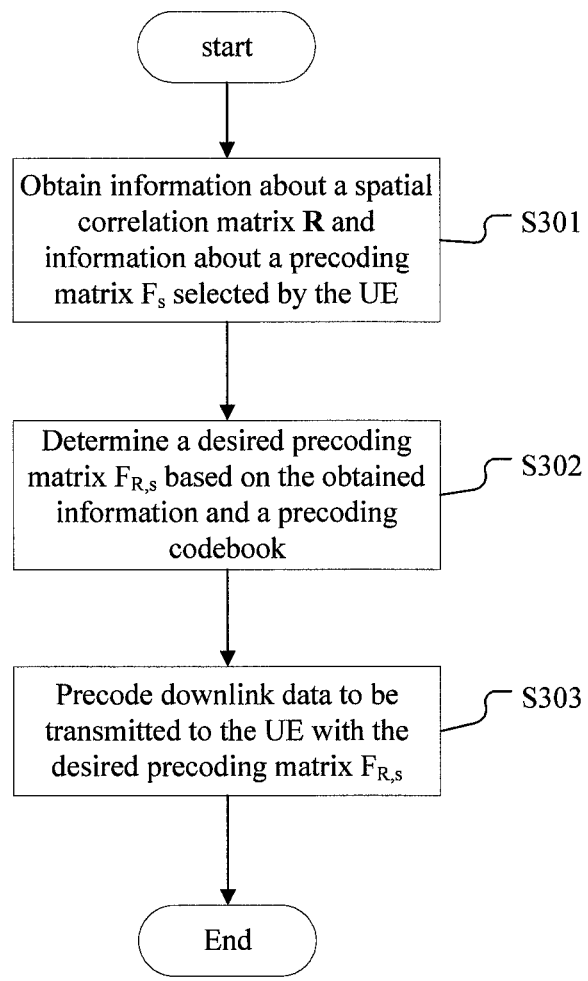
FIG. 3 illustrates an exemplary logic flow chart of a method for precoding data at a base station in a wireless communication system according to one embodiment of the present invention.

Now, referring to FIG. 3, FIG. 3 illustrates an exemplary logic flow chart of a method for precoding data at a base station in a wireless communication system according to one embodiment of the present invention. Hereinafter, the flow of FIG. 3 will be described in detail in conjunction with the wireless communication network environment 100 as shown in FIG. 1.

First, in step S301, the base station eNB obtains from the user equipment UE relevant information of a spatial correlation matrix R of M transmit antennas of the base station and relevant information of a precoding matrix $F_s$ as selected by the user equipment UE. As the above mentioned, for example, the above relevant information may be for example an index of the spatial correlation matrix R in the spatial correlation matrix codebook and an index of the selected precoding matrix $F_s$ in the fixed precoding codebook F.

Next, in step S302, the base station eNB determines a desired precoding matrix $F_{R,s}$ based on the obtained information and the precoding codebook F.

Specifically, in one embodiment, the base station eNB retrieves the selected precoding matrix $F_s$ from the precoding codebook F based on the index of the precoding matrix $F_s$ as obtained in step S301 and retrieves the spatial correlation matrix R from the spatial correlation matrix codebook based on the index of the spatial correlation matrix R.

Then, by transforming the selected precoding matrix $F_s$ with the retrieved spatial correlation matrix R, the desired precoding matrix $F_{R,s}$ may be obtained. The desired precoding matrix can compensate for the channel condition and improve channel performances because it considers the spatial correlation between transmit antennas as fed back by the user equipment.

In one embodiment, corresponding to the transformation of the precoding codebook F performed by the user equipment UE in step S202 of FIG. 2, the base station eNB transforms the selected precoding matrix $F_s$ according to the following equation so as to obtain the desired precoding matrix $F_{R,s}$: $F_{R,s} = RF_s$.

Finally, in step S303, the base station eNB precodes downlink data to be transmitted to the user equipment with the desired precoding matrix $F_{R,s}$.

By using the desired precoding matrix $F_{R,s}$, the downlink data may be precoded in a plurality of manners.

In one embodiment, the base station eNB regards the conjugate transpose of the desired precoding matrix $F_{R,s}$ as an approximate effective channel matrix $\tilde{H}$ of the user equipment UE. $\tilde{H}$ denotes a two-dimension matrix of m×M and can be expressed as:

$$\tilde{H} = F_{R,s}{}^H = (RF_s)^H = F_s{}^H R^H = F_s{}^H R.$$

Then, the downlink data of each user equipment may be precoded using the derived approximate effective channel matrix of the user equipment UE. For example, a zero-forcing (ZF) precoding can be performed. Such precoding manner is not only suitable for the single user SU-MIMO but also suitable for the multi-user MU-MIMO.

In another embodiment, in a case where there are multiple user equipments, the base station eNB obtains information fed back from each user equipment UE. Thus, the base station eNB may obtain a desired precoding matrix $F_{R,s,i}$ of each user equipment, respectively, wherein the subscript i denotes a user equipment. By using a possible orthogonal feature between the precoding matrixes $F_{R,s,i}$ of the user equipments, the user equipments whose desired precoding matrixes $F_{R,s,i}$ are mutually orthogonal can be scheduled.

However, in this precoding manner, each user equipment UE has transformed the precoding codebook using the derived spatial correlation matrix in step S202 of FIG. 2. Thus, such a scenario might occur, where it is possible that no orthogonal pairs exist between the desired precoding matrixes $F_{R,s,i}$ of respective user equipments as derived by the base station eNB in step S302 of FIG. 3. Therefore, it is possible to reduce the probability of pairing between multiple users, thereby limiting the performance of the multi-user MU-MIMO.

In view of the above, at the base station eNB, the preceding precoding manner is preferably used to precode the downlink data.

Each time the user equipment derives a new spatial correlation matrix and feeds it back to the base station eNB, the user equipment UE and the base station eNB update their respective spatial correlation matrix so as to be available during the transformation process.

Figure 4:
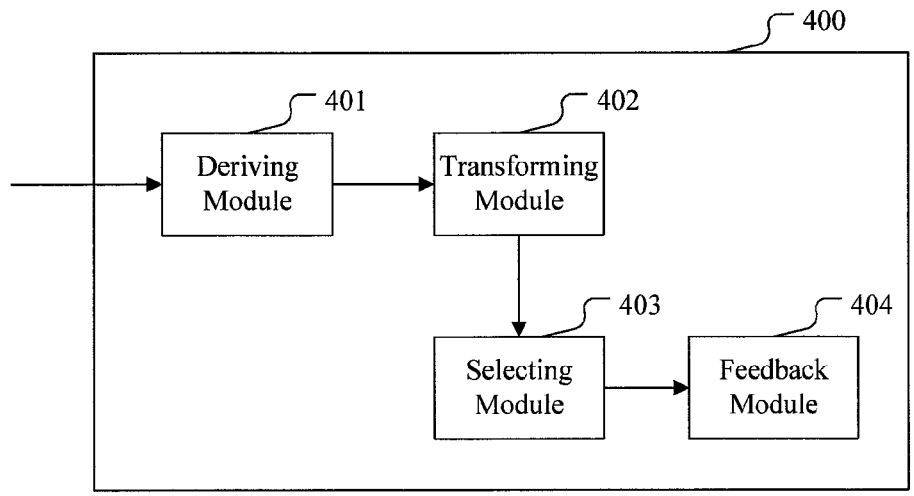
FIG. 4 illustrates a schematic structure diagram of an apparatus for processing communication data at a user equipment in a wireless communication system according to one embodiment of the present invention.

FIG. 4 illustrates a schematic structure diagram of an apparatus 400 for processing communication data at a user equipment in a wireless communication system according to one embodiment of the present invention.

As illustrated in FIG. 4, the apparatus 400 may comprise a deriving module 401, a transforming module 402, a selecting module 403, and a feedback module 404.

The deriving module 401 may derive a spatial correlation matrix R of M transmit antennas in the base station eNB based on an obtained downlink channel transmission matrix H, wherein H is a two-dimension matrix of N×M, R is the two-dimension matrix of M×M.

Generally, the user equipment UE may perform channel estimation based on the downlink channel signal it receives from the base station eNB to thereby obtain the downlink channel transmission matrix H.

In one embodiment, the deriving module 401 is configured to average the downlink channel transmission matrix H in time and/or frequency, thereby deriving the spatial correlation matrix R of the M transmit antennas in the base station. For example, $R = E[H^H \cdot H]$, wherein $^H$ denotes conjugate transpose, i.e., R is the average value on multiple time points and/or multiple subcarriers.

The transforming module 402 may transform the precoding codebook F based on the spatial correlation matrix R as derived by the deriving module 401. The precoding codebook is a codebook having a finite number of matrixes which is known to or synchronized at both the user equipment UE and the base station eNB.

In one embodiment, the transforming module 402 is configured to quantize the spatial correlation matrix R, and then transforms the precoding codebook F using the quantized spatial correlation matrix, thereby obtaining the transformed precoding codebook $F_R$. The subscript R denotes that transformation has been performed using the spatial correlation matrix, i.e., spatial correlation adaptation has been conducted.

The spatial correlation matrix R may be quantized in a plurality of manners. In one embodiment, the spatial correlation matrix R is quantized based on a spatial correlation matrix codebook. Similar to the precoding codebook, the spatial correlation matrix codebook is also a codebook having a finite number of matrixes which is known to or synchronized at both the user equipment UE and the base station eNB.

In one embodiment, the transforming module 402 may be configured to transform each codeword $F_k$ in the precoding codebook F according to the following expression so as to obtain the corresponding transformed precoding matrix $F_{R,k}$:

$$F_{R,k}=RF_k.$$

The selecting module 403 may select a precoding matrix $F_s$ based on the precoding codebook $F_R$ transformed by the transforming module 402.

In one embodiment of the present invention, the selecting module 403 is configured to select a precoding matrix closest to the optimal precoding matrix from the precoding codebook $F_R$ transformed by the transforming module 402. Because each precoding matrix $F_{R,k}$ in the transformed precoding codebook $F_R$ may be expressed as $F_{R,k}=RF_k$, from another perspective, the selecting module 403 is configured to select a precoding matrix $F_s$ from a fixed precoding codebook F, such that the distance between the precoding matrix $F_{R,s}$ being transformed with the spatial correlation matrix R and the optimal precoding matrix is minimized.

Specifically, in one embodiment, at each user equipment UE, the selecting module 403 is configured to perform singular value decomposition on the obtained downlink channel transmission matrix H, deriving $H=U\Sigma V^H$. Next, the first m columns of elements of the right side unitary singular matrix V as obtained by the above singular value decomposition are taken as the optimal precoding matrix $V_m$, wherein m denotes the number of data streams transmitted to the user equipment. Then, the selecting module 403 may select a precoding matrix $F_{R,s}$ with a minimal distance from the optimal matrix $V_m$ among the transformed precoding codebook $F_R$, wherein the subscript s denotes the selected precoding matrix. The above selection process may be expressed as:

$$F_{R,s}=\arg\min\nolimits_{F_{R,k}\in F_R}d(V_m F_{R,k}^H),$$

wherein $d(V_m F_{R,k}^H)$ is the distance function of $V_m F_{R,k}^H$.

In one embodiment, the distance function $d(V_m F_{R,k}^H)$ may be:

$$d(V_m F_{R,k}^H) = 1 - \frac{tr(\text{abs}(V_m F_{R,k}^H))}{\|V_m\|_F \|F_{R,k}\|_F},$$

wherein $^H$ denotes conjugate transpose, $\|\cdot\|_F$ denotes matrix Frobenius norms, abs( ) denotes the modular of a matrix, and tr( ) denotes the trace of a matrix.

In another embodiment, the distance function may adopt other form, for example, the chordal distance, the projection two-norm distance, the Fubini-Study distance, etc.

Because the precoding matrix $F_{R,k}$ in the transformed precoding codebook $F_R$ may be expressed as $F_{R,k}=RF_k$, the above selection process may also be expressed as:

$$F_s=\arg\min\nolimits_{F_k\in F}d(V_m(RF_k)^H)=\arg\min\nolimits_{F_k}{}^{\in F}d(V_m F_k^H R),$$
because $R^H=R$.

In other words, the selecting module 403 selects a precoding matrix $F_s$ from the fixed precoding codebook F, such that the distance between the precoding matrix $F_{R,s}$ being transformed with the spatial correlation matrix R and the optimal precoding matrix $V_m$ is minimized.

The feedback module 404 may feed back relevant information of the spatial correlation matrix R and relevant information of the selected precoding matrix $F_s$ to the base station eNB. In one embodiment, the relevant information of the spatial correlation matrix R may be for example an index of the quantized spatial correlation matrix in the spatial correlation matrix codebook, while the relevant information of the selected precoding matrix $F_s$ may be for example an index of the selected precoding matrix $F_s$ in the fixed precoding codebook F.

Figure 5:
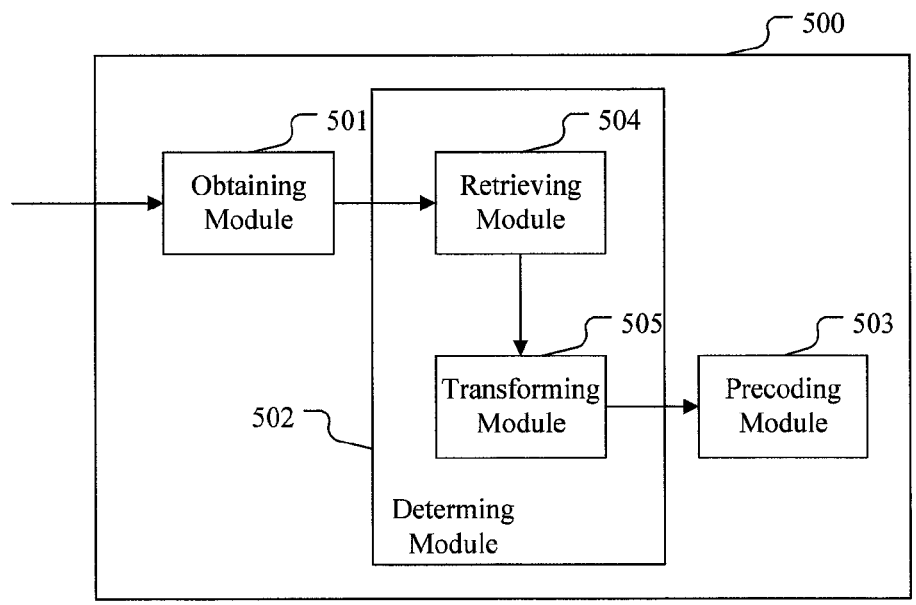
FIG. 5 illustrates a schematic structure diagram of an apparatus for precoding data at a base station (eNB) in a wireless communication system according to one embodiment of the present invention.

FIG. 5 illustrates a schematic structure diagram of an apparatus 500 for precoding data at a base station (eNB) in a wireless communication system according to one embodiment of the present invention.

As shown in FIG. 5, the apparatus 500 may comprise an obtaining module 501, a determining module 502, and a precoding module 503, wherein the determining module 502 may further comprise a retrieving module 504 and a transforming module 505.

The obtaining module 501 is configured to obtain relevant information of a spatial correlation matrix R of M transmit antennas of the base station and relevant information of a precoding matrix $F_s$ selected by the user equipment UE. As the above mentioned, for example, the above relevant information may be for example an index of the spatial correlation matrix R in a spatial correlation matrix codebook and an index of the selected precoding matrix $F_s$ in the fixed precoding codebook F.

Then, the determining module 502 may determine a desired precoding matrix $F_{R,s}$ based on the obtained relevant information and the precoding codebook F.

Specifically, the determining module 502 may comprise a retrieving module 504 configured to retrieve the selected precoding matrix $F_s$ from the precoding codebook F based on the index of the precoding matrix $F_s$ as obtained by the obtaining module, and to retrieve the spatial correlation matrix R from the spatial correlation matrix codebook based on the index of the spatial correlation matrix R.

The determining module 502 may also comprise a transforming module 505 configured to transform the selected precoding matrix $F_s$ using the spatial correlation matrix R as retrieved by the retrieving module 504, thereby obtaining a desired precoding matrix $F_{R,s}$.

In one embodiment, corresponding to transforming the precoding codebook F by the transforming module 402 in FIG. 4, the transforming module 505 transforms the selected precoding matrix $F_s$ according to the following expression to obtain the desired precoding matrix $F_{R,s}$: $F_{R,s}=RF_s$.

The precoding module 503 is configured to precode downlink data to be transmitted to the user equipment UE using the desired precoding matrix $F_{R,s}$.

The precoding module 503 may adopt a plurality of manners to precode the downlink data.

In one embodiment, the precoding module 503 regards the conjugate transpose of the desired precoding matrix $F_{R,s}$ as an approximate effective channel matrix $\tilde{H}$ of the user equipment UE. $\tilde{H}$ denotes a two-dimension matrix of m×M, which may be expressed as:

$$\tilde{H}=F_{R,s}{}^H=(RF_s)^H=F_s^H R^H=F_s^H R.$$

Then, the precoding module 503 is configured to precode downlink data of each user equipment with the obtained approximate effective channel matrix of the user equipment UE. For example, zero-forcign (ZF) precoding may be performed.

In another embodiment, in a case where there are multiple user equipments, the base station eNB may obtain information fed back from each user equipment UE. Thus, the base station eNB may obtain respective desired precoding matrix $F_{R,s,i}$ of each user equipment, wherein the subscript i denotes a user equipment. The precoding module 503 may schedule the user equipments whose desired precoding matrixes $F_{R,s,i}$ are mutually orthogonal by using the possible orthogonal feature between the precoding matrixes $F_{R,s,i}$ of the user equipments.

Hereinafter, with a multi-user MU-MIMO wireless communication system as an example, simulation results of a technical solution using a fixed precoding codebook and a technical solution using a spatial correlation adaptive codebook are provided for implicit feedback.

The table below provides throughput simulation results so as to compare with the prior art, which illustrates the advantages of the technical solution of the present invention. Table 1 provides the system parameters and the values thereof used in the simulation.

TABLE 1

| Parameters | Values |
|---|---|
| Deployment scenario | 3GPP case 1, 3D, SCM-UMa with large angle spread |
| Duplex method and bandwidths | FDD: 10 MHz for downlink |
| Network synchronization | Synchronized |
| Handover margin | 1.0 dB |
| Antenna configuration (eNB) | Configuration C) Correlated: co-polarized: 0.5 wavelengths between antennas (4 Tx: ||||) |
| Antenna configuration (UE) | Vertically polarized antennas with 0.5 wavelengths separation at UE (2 Rx: ||) |
| Downlink transmission scheme | Single-cell Tx correlation-matrix aided MU-MIMO, rank 1 per UE |
| Downlink scheduler | Proportional fair in time and frequency |
| Feedback assumptions | Subband PMI, subband CQI, long-term wideband Tx correlation-matrix report PMI/CQI/RI report with 5 ms periodicity, 6 ms delay Tx correlation-matrix report with 100 ms periodicity, 6 ms delay Subband CQI with measurement error: N(0,1 dB) per PRB |
| Downlink HARQ scheme | Chase combining |
| Downlink receiver type | MMSE |
| Channel estimation | Ideal |
| Control channel and reference signal overhead | As agreed in ITU assumption with DL CCH of 3 OFDM symbols LTE-A: 0.3063 |

Table 2 provides the system-level simulation results.

TABLE 2

|  | Throughput | Cell edge |
|---|---|---|
| Fixed codebook | 3.2502 (100%) | 0.1128 (100%) |
| Adaptive codebook | 3.8517 (118.5%) | 0.1218 (108%) |

The simulation results show that for a multi-user MU-MIMO system, using the spatial correlation adaptive codebook can obtain a significant performance gain against using the fixed codebook.

Further, with a single-user SU-MIMO wireless communication system as an example, comparative analysis is performed on the performances of the technical solution adopting the adaptive codebook and implicit feedback of the present invention, the technical solution adopting the adaptive codebook and implicit feedback of the prior art, the technical solution adopting a fixed codebook and explicit feedback, a technical solution adopting a fixed codebook and implicit feedback, and a technical solution of performing SVD based on ideal channel information.

Without losing generality, suppose the base station eNB has 4 transmit antennas, the user equipment UE has 2 to 4 transmit antennas, the precoding codebook adopts a feedback codebook defined in LTE Release 8 (i.e., PMI codebook), and the simulation channel adopts an ITU channel model, the detailed simulation parameters as shown in Table 3 below.

| Parameters | Values |
|---|---|
| Transmission scheme | 1-4-rank SVD SU-MIMO |
| Numbers of BS and antenna configuration | One BS, 4 antennas, 0.5 or 4 wavelengths between antennas |
| Numbers of UE and antenna configuration | One user terminal, 2-4 antennas, 0.5 wavelengths between antennas |
| Modulation scheme | QPSK |
| Channel coding | ½ Turbo coding |
| Channel state information (CSI) feedback delay | 0 ms |
| Transmitter correlation matrix report delay | 0 ms |
| Transmitter correlation matrix quantization scheme | Ideal |
| Transmission resource | 5 LTE PRBs (Primary Resource Block) in frequency |
| Channel estimation | Ideal |
| Data detection | MMSE |
| Speed | 3 kmph or 30 kmph |
| Fast fading channel model | ITU channel model, UMi (Urban Micro) or UMa (Urban Macro) |
| Large Scale channel model | Lossless model |
| Simulation frame numbers | 1000 |
| Block size | 584 bits |
| Predetermined precoding codebook | 3GPP LTE Rel-8, 4 bits codebook for 4Tx |

FIGS. 6-15 illustrate the diagrams of the relation curves between the signal-to-noise ratios and the error bit rates of the above four technical solutions and the ideal SVD schemes under different parameter values, wherein the horizontal coordinates denote the signal-to-noise ratios (SNR) in dB; the longitudinal coordinates denotes the block error rates (BLER) in percentage; the solid line plus circle in the legend denotes the technical solution adopting an adaptive codebook and implicit feedback of the present invention, the solid line plus triangle in the legend denotes the technical solution adopting an adaptive codebook and implicit feedback in the prior art, the solid line plus square in the legend denotes the technical solution of adopting a fixed codebook and explicit feedback in the prior art, and the solid line plus rhombus denotes the technical solution adopting a fixed codebook and implicit feedback in the prior art, and the dotted line plus circle denotes the technical solution of performing SVD based on ideal channel information.

Figure 6:
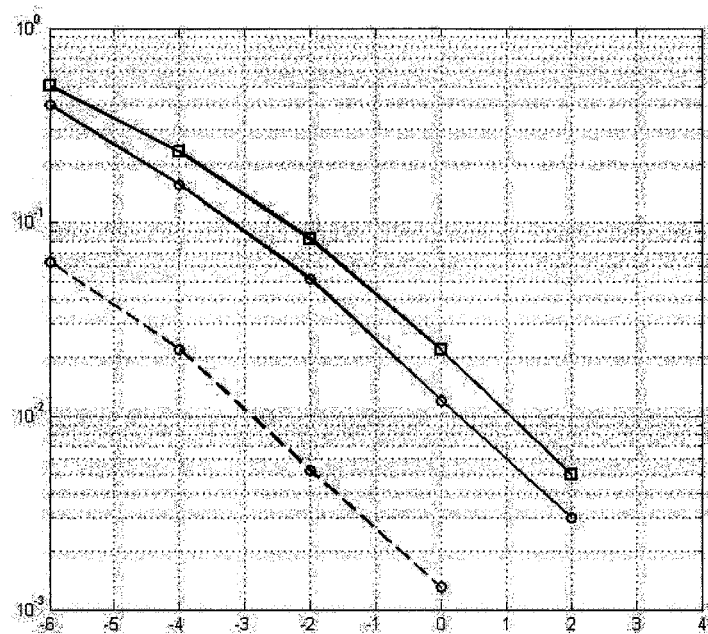
FIGS. 6-15 illustrate the simulation result comparison diagrams between the solutions according to embodiments of the present invention and the solutions in the prior art.

FIG. 6 shows a diagram of block error rates and signal-to-noise ratios of various technical solutions where an ITU-UMi channel model is adopted, 0.5 wavelengths is spaced between the transmit antennas of the base station, the movement velocity is 3 Km/h, the user equipment has 2 receive antennas, the code rate is ½, QPSK modulation is adopted, and the number of the transmit data steam is 1.

Figure 7:
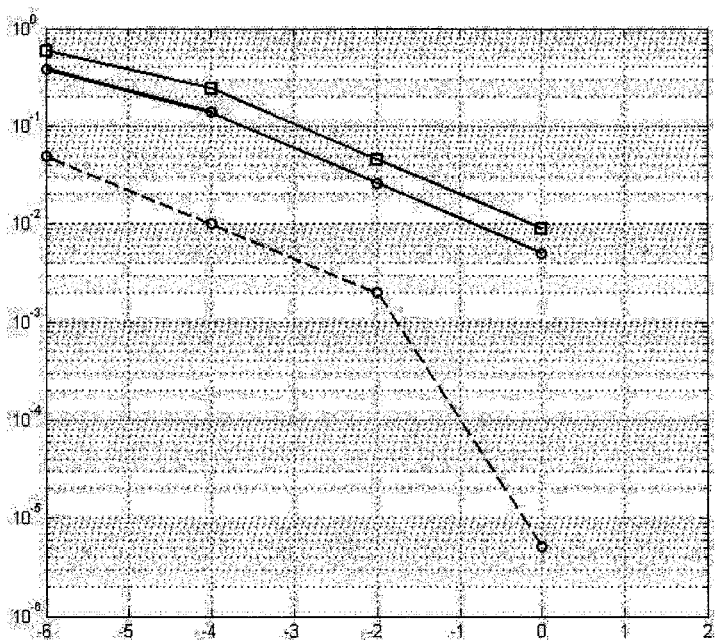

FIG. 7 shows a diagram of block error rates and signal-to-noise ratios of various technical solutions where an ITU-UMi channel model is adopted, 4 wavelengths is spaced between the transmit antennas of the base station, the movement velocity is 3 Km/h, the user equipment has 2 receive antennas, the code rate is ½, QPSK modulation is adopted, and the number of the transmit data steam is 1.

Figure 8:
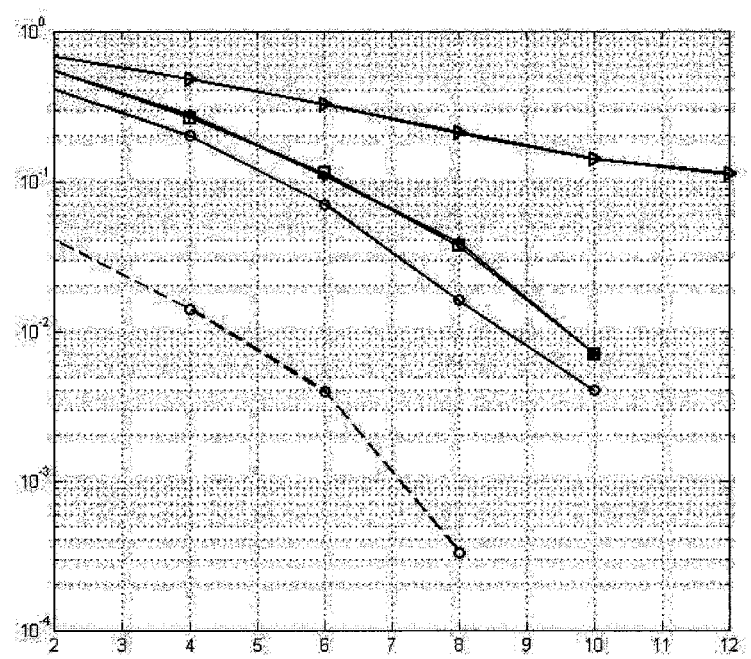

FIG. 8 shows a diagram of block error rates and signal-to-noise ratios of various technical solutions where an ITU-UMi channel model is adopted, 0.5 wavelengths is spaced between the transmit antennas of the base station, the movement velocity is 3 Km/h, the user equipment has 2 receive antennas, the code rate is ½, QPSK modulation is adopted, and the number of the transmit data steam is 2.

Figure 9:
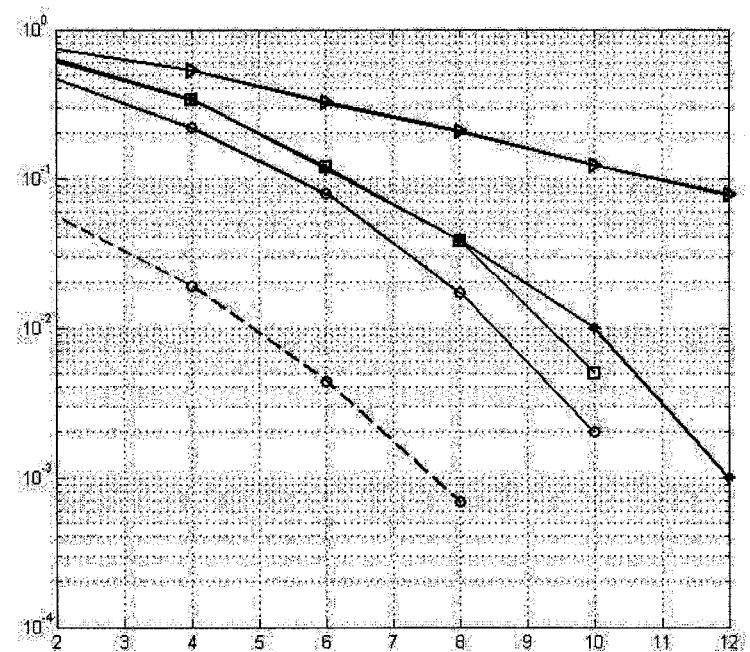

FIG. 9 shows a diagram of block error rates and signal-to-noise ratios of various technical solutions where an ITU-UMa channel model is adopted, 0.5 wavelengths is spaced between the transmit antennas of the base station, the movement velocity is 3 Km/h, the user equipment has 2 receive antennas, the code rate is ½, QPSK modulation is adopted, and the number of the transmit data steam is 2.

Figure 10:
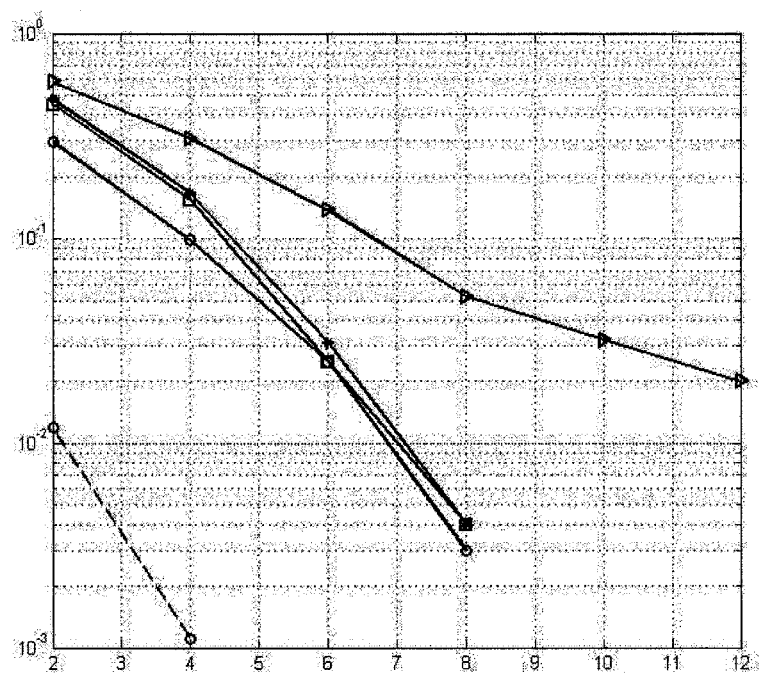

FIG. 10 shows a diagram of block error rates and signal-to-noise ratios of various technical solutions where an ITU-UMi channel model is adopted, 4 wavelengths is spaced between the transmit antennas of the base station, the movement velocity is 3 Km/h, the user equipment has 2 receive antennas, the code rate is ½, QPSK modulation is adopted, and the number of the transmit data steam is 2.

Figure 11:
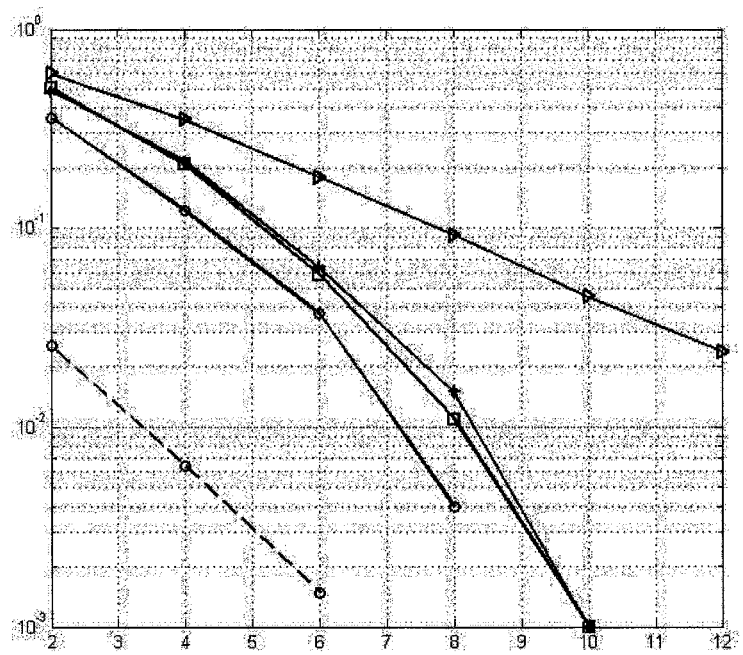

FIG. 11 shows a diagram of block error rates and signal-to-noise ratios of various technical solutions where an ITU-UMa channel model is adopted, 4 wavelengths is spaced between the transmit antennas of the base station, the movement velocity is 3 Km/h, the user equipment has 2 receive antennas, the code rate is ½, QPSK modulation is adopted, and the number of the transmit data steam is 2.

Figure 12:
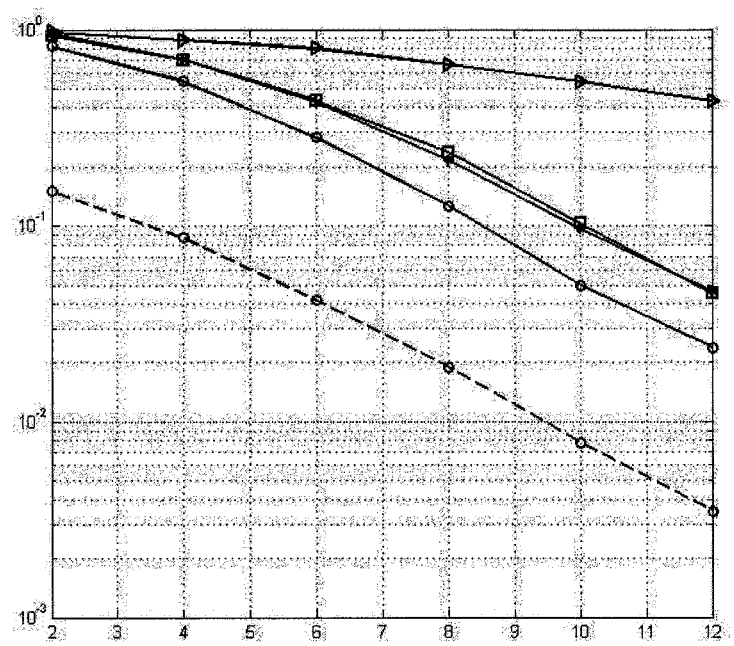

FIG. 12 shows a diagram of block error rates and signal-to-noise ratios of various technical solutions where an ITU-UMi channel model is adopted, 0.5 wavelengths is spaced between the transmit antennas of the base station, the movement velocity is 3 Km/h, the user equipment has 3 receive antennas, the code rate is ½, QPSK modulation is adopted, and the number of the transmit data steam is 3.

Figure 13:
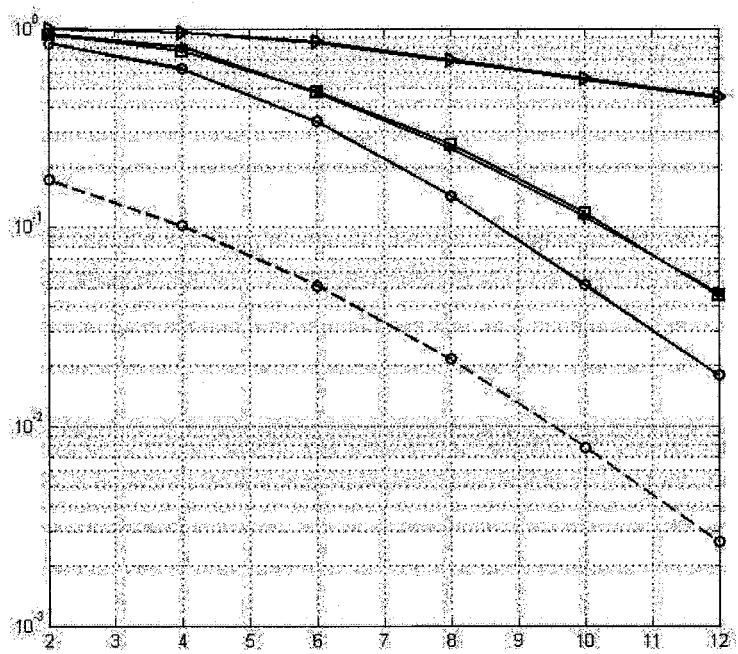

FIG. 13 shows a diagram of block error rates and signal-to-noise ratios of various technical solutions where an ITU-UMa channel model is adopted, 0.5 wavelengths is spaced between the transmit antennas of the base station, the movement velocity is 30 Km/h, the user equipment has 3 receive antennas, the code rate is ½, QPSK modulation is adopted, and the number of the transmit data steam is 3.

Figure 14:
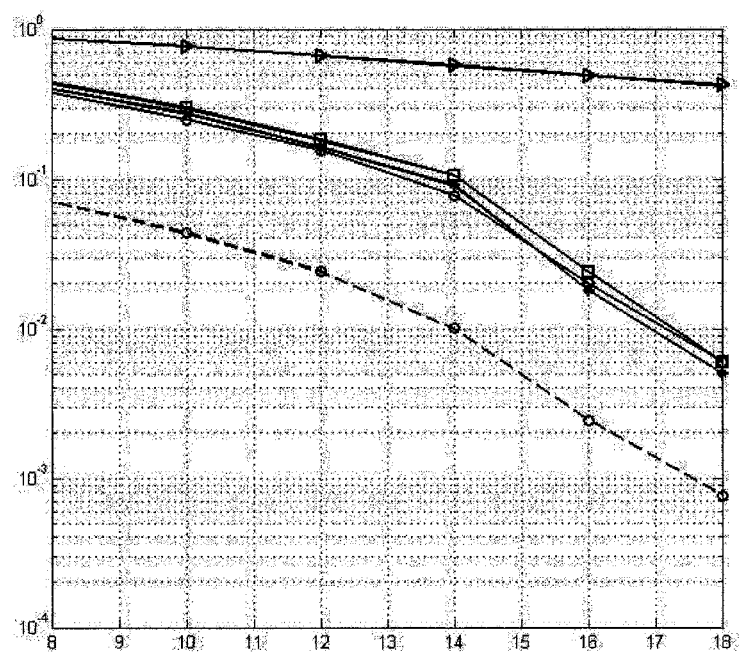

FIG. 14 shows a diagram of block error rates and signal-to-noise ratios of various technical solutions where an ITU-UMi channel model is adopted, 0.5 wavelengths is spaced between the transmit antennas of the base station, the movement velocity is 3 Km/h, the user equipment has 4 receive antennas, the code rate is ½, QPSK modulation is adopted, and the number of the transmit data steam is 4.

Figure 15:
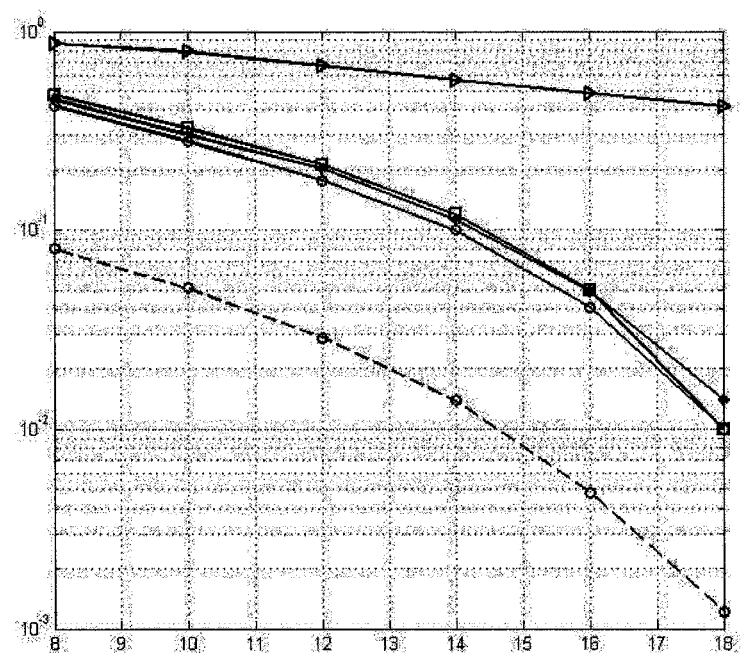

FIG. 15 shows a diagram of block error rates and signal-to-noise ratios of various technical solutions where an ITU-UMa channel model is adopted, 4 wavelengths is spaced between the transmit antennas of the base station, the movement velocity is 30 Km/h, the user equipment has 4 receive antennas, the code rate is ½, QPSK modulation is adopted, and the number of the transmit data steam is 4.

Table 4 shows the signal-to-noise ratios of respective technical solutions when the block error rate is 0.1.

TABLE 4

| System parameters | The adaptive codebook plus implicit feedback of the present invention | The adaptive codebook plus implicit feedback of the prior art | Fixed codebook plus explicit feedback | Fixed codebook plus implicit feedback |
|---|---|---|---|---|
| The number of the transmit data stream is 1, UMi channel model, 0.5 wavelengths between transmit antennas | −3.2 dB | −3.2 dB | −2.4 dB | −2.4 dB |
| The number of the transmit data stream is 1, UMi channel model, 4 wavelengths between transmit antennas | −3.4 dB | −3.4 dB | −3 dB | −3 dB |
| The number of the transmit data stream is 2, UMi channel model, 0.5 wavelengths between transmit antennas | 5.4 dB | 12 dB | 6.2 dB | 6.2 dB |
| The number of the transmit data stream is 2, UMa channel model, 0.5 wavelengths between transmit antennas | 5.5 dB | 11 dB | 6.4 dB | 6.4 dB |
| The number of the transmit data stream is 2, UMi channel model, 4 wavelengths between transmit antennas | 4 dB | 6.8 dB | 4.5 dB | 4.6 dB |
| The number of the transmit data stream is 2, UMa channel model, 4 wavelengths between transmit antennas | 4.4 dB | 7.8 dB | 5.2 dB | 5.3 dB |
| The number of the transmit data stream is 3, UMi channel model, 0.5 wavelengths between transmit antennas | 8.5 dB | More than 12 dB | 10 dB | 10 dB |
| The number of the transmit data stream is 3, UMa channel model, 0.5 wavelengths between transmit antennas | 8.8 dB | More than 12 dB | 10.3 dB | 10.3 dB |
| The number of the transmit data stream is 4, UMi channel model, 0.5 wavelengths between transmit antennas | 13.5 dB | More than 18 dB | 14.2 dB | 14 dB |

TABLE 4-continued

| System parameters | The adaptive codebook plus implicit feedback of the present invention | The adaptive codebook plus implicit feedback of the prior art | Fixed codebook plus explicit feedback | Fixed codebook plus implicit feedback |
|---|---|---|---|---|
| The number of the transmit data stream is 4, UMa channel model, 0.5 wavelengths between transmit antennas | 14 dB | More than 18 dB | 14.5 dB | 14.4 dB |

FIGS. 6 to 15 show that compared with the prior art, the technical solution of the adaptive codebook of the present invention in an implicit feedback system has the lowest block error rate under the same signal-to-noise ratio or has the lowest signal-to-noise ratio under the same block error rate.

The above simulations show that the technical solution of the present invention is not only suitable for a single-user SU-MIMO, but also suitable for a multi-user MU-MIMO. Moreover, for each user, it may have a single data stream or multiple data streams. Besides, the technical solution as proposed for the present invention is easily implemented. For example, a 4-transmit-antenna feedback codebook in the current LTE Release 8 may be used as the basic codebook for performing correlation adaptation. The only extra signaling overhead is for feeding back the spatial correlation matrix. Further, the above example analysis also shows that the computational complexity of the present invention is very low.

It should be noted that the embodiments of the present invention can be implemented with software, hardware or the combination thereof. The hardware part can be implemented by a special logic; the software part can be stored in a memory and executed by a proper instruction execution system such as a microprocessor or a design-specific hardware.

It should be noted that in order to make the present invention more comprehensible, the above description omits some more specific technical details which are known to the skilled in the art and may be essential to implement the present invention.

The purpose for providing the description of the present invention is to explain and describe, not to exhaust or limit the present invention within the disclosed form. To a person of normal skill in the art, various modifications and alternations are obvious.

Thus, selecting and describing the preferred embodiments is to better illustrate the principle and practical application of the present invention and to enable a person of normal skill in the art to appreciate that without departing the spirit of the present invention, all modifications and alterations fall within the protection scope of the present invention as limited by the appending claims.

What is claimed is:

1. A method for processing communication data at a user equipment in a wireless communication system, comprising:
   deriving a spatial correlation matrix R of multiple transmit antennas of a base station based on an obtained downlink channel transmission matrix H;
   transforming a precoding codebook F according to the spatial correlation matrix R;
   selecting a precoding matrix $F_s$ based on the transformed precoding codebook; and
   feeding back information about the spatial correlation matrix R and information about the selected precoding matrix $F_s$ to the base station, wherein the information about the selected precoding matrix $F_s$ includes an index of the selected precoding matrix $F_s$ in the precoding codebook, and the information about the spatial correlation matrix R includes an index of the spatial correlation matrix R in a spatial correlation matrix codebook.

2. The method of claim 1, wherein the deriving comprises:
   averaging the downlink channel transmission matrix H in time and/or frequency to obtain said spatial correlation matrix R.

3. The method of claim 1, wherein the transforming comprises:
   quantizing the spatial correlation matrix R; and
   transforming the precoding codebook with the quantized spatial correlation matrix.

4. The method of claim 3, wherein at least one codeword $F_k$ in the precoding codebook F is transformed to obtain the transformed precoding matrix $F_{R,k}$ according to $F_{R,k}=RF_k$, where k=1, ..., K, and K is a position integer.

5. The method of claim 1, wherein the selecting comprises:
   performing singular value decomposition on the downlink channel transmission matrix H to obtain $H=U\Sigma V^H$;
   taking the first m columns of elements in a right unitary singular matrix V obtained from the singular value decomposition as an ideal precoding matrix $V_m$, where m is the number of data streams transmitted to the user equipment; and
   selecting the precoding matrix $F_s$ from the precoding codebook such that the distance between a precoding matrix $F_R$ transformed via the spatial correlation matrix and the ideal precoding matrix $V_m$ is minimized.

6. The method of claim 5, wherein the distance is $$1 - \frac{tr(\text{abs}(V_m F_k^H))}{\|V_m\|_F \|F_k\|_F},$$

where k=1,...,K, K is a position integer, $^H$ denotes conjugate transpose, $\mu \cdot \mu_F$ denotes matrix Frobenius norms, abs( ) denotes the modular of a matrix, and tr( ) denotes the trace of a matrix; or
   the distance is chosen from a group consisted of the chordal distance, the projection two-norm distance and the Fubini-Study distance.

7. A method for data precoding at a base station in a wireless communication system, comprising:
   obtaining, from a user equipment, information about a spatial correlation matrix R of multiple transmit antennas of the base station and information about a precoding matrix $F_s$ selected by the user equipment;
   determining a desired precoding matrix $F_{R,s}$ based on the obtained information and a precoding codebook, wherein the determining comprises: retrieving the selected precoding matrix $F_s$ from the precoding codebook based on the information about the selected precoding matrix $F_s$, wherein the information about the selected precoding matrix includes an index of the selected precoding matrix in the precoding codebook, and retrieving the spatial correlation matrix R from a spatial correlation matrix codebook based on the information about the spatial correlation matrix R, wherein the information about the spatial correlation matrix R includes an index of the spatial correlation matrix R in the spatial correlation matrix codebook, and transforming the selected precoding matrix $F_s$ with the spatial correlation matrix R to obtain the desired precoding matrix $F_{R,s}$; and precoding downlink data to be transmitted to the user equipment with the desired precoding matrix $F_{R,s}$.

8. The method of claim 7, wherein the precoding comprises:

taking the conjugate transpose of the desired precoding matrix $F_{R,s}$ as an approximate effective channel matrix of the user equipment; and precoding the downlink data to be transmitted to the user equipment based on the approximate effective channel matrix.

9. The method of claim 7, wherein in a case where there are multiple user equipments, the precoding comprises: scheduling user equipments of the multiple user equipments whose desired precoding matrices $F_{R,s}$ are orthogonal to each other.

10. An apparatus for processing communication data at a user equipment in a wireless communication system, comprising:

a deriving module, configured to derive a spatial correlation matrix R of multiple transmit antennas of a base station based on an obtained downlink channel transmission matrix H;

a transforming module, configured to transform a precoding codebook F according to the spatial correlation matrix R;

a selecting module, configured to select a precoding matrix $F_s$ based on the transformed precoding codebook; and a feedback module, configured to feed back information about the spatial correlation matrix R and information about the selected precoding matrix $F_s$ to the base station, wherein the information about the selected precoding matrix $F_s$ includes an index of the selected precoding matrix $F_s$ in the precoding codebook, and the information about the spatial correlation matrix R includes an index of the spatial correlation matrix R in a spatial correlation matrix codebook.

11. The apparatus of claim 10, wherein the selecting module is configured to:

perform singular value decomposition on the downlink channel transmission matrix H to obtain $H = U\Sigma V^H$;

take the first m columns of elements in the right unitary singular matrix V obtained from the singular value decomposition as an ideal precoding matrix $V_m$, where m is the number of data streams transmitted to the user equipment; and select the precoding matrix $F_s$ from the precoding codebook such that the distance between a precoding matrix $F_R$ transformed via the spatial correlation matrix and the ideal precoding matrix $V_m$ is minimized.

12. An apparatus for data precoding at a base station in a wireless communication system, comprising:

an obtaining module, configured to obtain, from a user equipment, information about a spatial correlation matrix R of multiple transmit antennas of the base station and information about a precoding matrix $F_s$ selected by the user equipment;

a determining module, configured to determine a desired precoding matrix $F_{R,s}$ based on the obtained information and a precoding codebook;

a precoding module, configured to precode downlink data to be transmitted to the user equipment with the desired precoding matrix $F_{R,s}$;

a retrieving unit, configured to retrieve the selected precoding matrix $F_s$ from the precoding codebook based on the information about the selected precoding matrix $F_s$, wherein the information about the selected precoding matrix includes an index of the selected precoding matrix in the precoding codebook, and to retrieve the spatial correlation matrix R from a spatial correlation matrix codebook based on the information about the spatial correlation matrix R, wherein the information about the spatial correlation matrix R includes an index of the spatial correlation matrix R in the spatial correlation matrix codebook; and a transforming unit, configured to transform the selected precoding matrix $F_s$ with the spatial correlation matrix R to obtain the desired precoding matrix $F_{R,s}$.

\* \* \* \* \*